Aug. 18, 1959     K. F. FRANK     2,899,827
THREE BALL MOUNT
Filed Sept. 8, 1953

INVENTOR.
KARL F. FRANK
BY
ATTORNEY.

United States Patent Office 2,899,827
Patented Aug. 18, 1959

2,899,827

THREE BALL MOUNT

Karl F. Frank, Garden City, N.Y., assignor to Micro Balancing, Inc., Garden City Park, N.Y.

Application September 8, 1958, Serial No. 759,618

3 Claims. (Cl. 73—475)

This invention relates to mounting means having free vibration in one plane and more particularly to mounting means for rotor balancing machines.

More particularly the invention relates to novel mounting means using three ball mounts and a frictionless restraining means for limiting the allowable motion to one plane.

In the dynamic balancing of rotating parts such as machine rotors, it is necessary to mount the parts under test in a cradle which is free to vibrate in one horizontal plane. The test rotors are generally mounted by placing each end of their shaft in a cradle having a bearing seat, the cradle being mounted for free movement. When the test piece is rotated, any unbalance will cause movements of the mounts which are then detected and used to balance the test rotor.

It is desirable to use ball mounts for the cradles since they have self-centering properties and have very low friction. Prior ball mounts generally use two balls, one on each side of the cradle in a common plane perpendicular to the axis of rotation of the test rotor. This arrangement is not too desirable since the mounting of the cradle is unstable and it tends to fall off the two ball mounts. Therefore, separate means must be provided for this type system to limit the amount of travel of the cradle.

Another difficulty is that the cradle tends to walk or move along the axis of rotation of the test piece. This motion is caused by wind loading of the test piece and also due to small imperfections in the surface of the shaft of the test piece which scratches the bearings of the cradles and imparts a screw-like motion to the cradles.

The present invention solves these difficulties by providing a third ball mount in a different vertical plane from the first two ball mounts so that the cradle is supported at three points and the tendency to tip over is minimized. Applicant also provides means to limit the motion of the cradle primarily to a plane perpendicular to the axis of rotation. This is done by having a post which contacts the inner surface of the slot. The ball bearing is important since it eliminates friction from between the post and the slot surface which is objectionable since it would destroy the accuracy of any readings. The post is preferably mounted on the axis of rotation so that a certain amount of rotation of the cradle is allowed. This is desirable in order to seat the test piece accurately and eliminate errors due to rotational forces developed because the test piece was not accurately supported.

Accordingly, a principal object of the invention is to provide new and improved mounting means for free vibration.

Another object of the invention is to provide new and improved mounting means for vibration of a mounting in one horizontal plane.

Another object of the invention is to provide new and improved mounting means for rotor balancing machines.

Another object of the invention is to provide new and improved mounting means of the ball type.

Another object of the invention is to provide new and improved mounting means using three ball mountings, at least one of which is in a different vertical plane than the other two to prevent tipping of the mounting.

Another object of the invention is to provide new and improved mounting means using three ball mounts and means to limit the vibration to one vertical plane comprising a slot in the moving member and a rod mounted ball bearing connected to the lower member and engaging said slot.

These and other objects of the invention will be apparent from the following specifications and drawings, of which:

Figure 1:
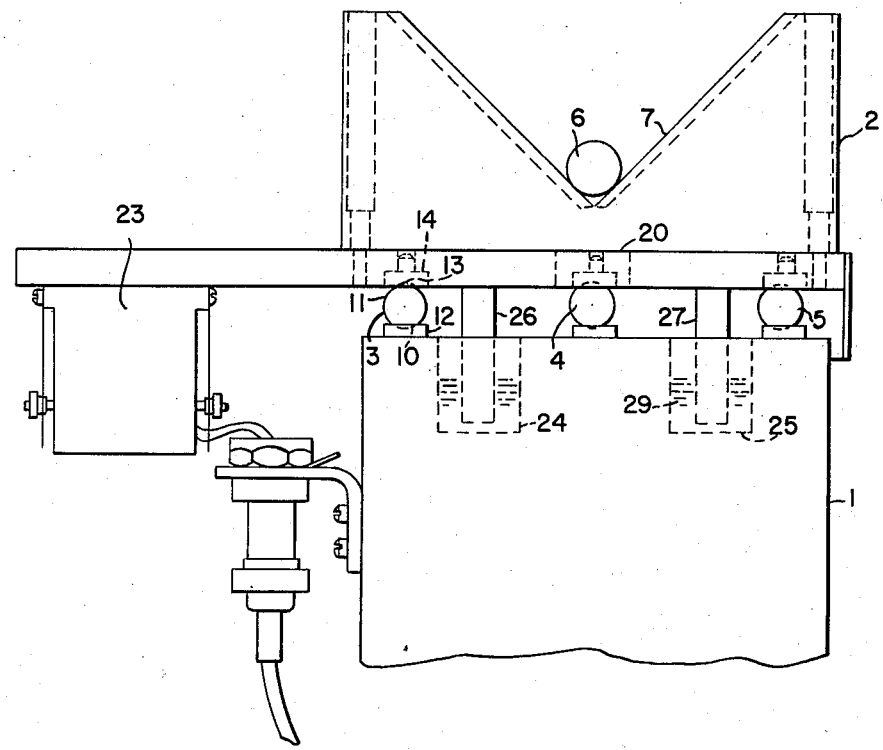
Figure 1 is a side elevation view of an embodiment of the invention.

Referring to the figures, the mounting means of the present invention generally comprises a stationary pedestal member 1 and a V-block 2 which is mounted for free vibration on the pedestal member by means of the three ball mounts 3, 4, and 5. In the illustrations the mounting means is shown used in a dynamic balancing machine, one end of the test rotor 6 being placed in the bearing seat 7 of the V-block 2. The other end of the test rotor 6 is placed in a similar mounting to that shown in Figure 1.

The ball mounts each comprise a lower curved indentation 10 having a radius of curvature larger than that of the ball 11, the indentation 10 being either machined into the lower pedestal 1 or into a block 12 connected to the lower pedestal. A corresponding indentation 13 is machined into the upper movable V-block or is machined in an insert 14 mounted in the V-block.

Figure 2:
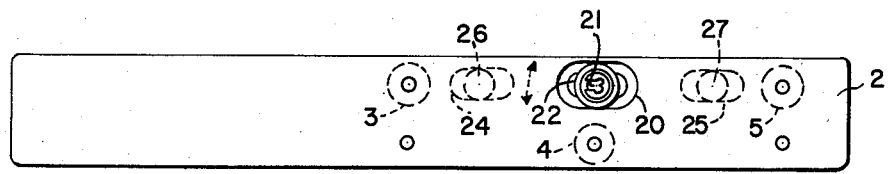
Figure 2 is a top view of the embodiment of Figure 1.

Referring to Figure 2 showing a top view with the V-block removed, the ball mounts are mounted to provide a three point support, the ball mounts being arranged at the points of a triangle. In the embodiment shown, the ball mounts 3 and 5 are in one vertical plane, and the ball mount 4 is in a different vertical plane equally spaced between the ball mounts 3 and 5 and on the axis of rotation of the test rotor.

In order to limit the motion of the movable block, means are provided comprising a slot 20 machined into the base of the V-block. A rod 21 is mounted in the lower pedestal 1 and extends upward through the slot 20. A ball bearing 22 is mounted on the rod 21 and is adapted to fit loosely into slot 20 so that the movement of the movable V-block is generally constrained to the vertical plane along the major axis of the slot. The rod is mounted on the axis of rotation of the test rotor 6 so that some rotation of the movable block 2 is possible as shown by the arrows. A small amount of this rotational movement is desirable so that the test piece will automatically seat itself squarely on the bearing blocks.

Therefore, when the test piece is rotated, any unbalance will cause a movement of the movable block on the ball mounts and this movement will be constrained generally to a vertical plane determined by the slot 20. It is important that the ball bearing 22 be used to provide a substantially frictionless contact between the stationary mount and the movable mount. For instance, a loosely fitting post in the slot would not be operative since there would be too much friction developed and there would be knocking of the movable mount sufficient to destroy the sensitive readings desired. In order to measure the vibrations, a seismic vibration pickup 23 is connected to the movable mount 2 so that only the motion caused by unbalance is sensed and external or floor vibrations are completely isolated from this pickup. The details of the vibration pickup may be conventional and are outside the scope of the present application. It may be of the type having a magnet suspended by leaf springs with a coil detector in the magnetic field.

Note that the pickup 23 is not connected to the support 1. Therefore, external vibrations cannot be transmitted from the floor, nor can undesired signals from the second pickup at the other end of the test piece be transmitted through the support.

If it is desired to obtain damping of the movable mount, this may be provided by incorporating wells or depressions 24 and 25 in the stationary mount 1 which would be filled with a viscous fluid 29. Rods 26 and 27 fixedly connected to the movable mount extend downwardly and into the viscous fluid in the wells. The amount of damping may be varied by the level or viscosity of the damping fluid.

One of the advantages of the ball mounts is that they are self-centering. The mounting of the present invention is not limited to dynamic balancing machines but may be used wherever it is desired to isolate or measure motions or vibrations.

Various modifications may be made without departing from the scope of the invention. The dimension of the balls and indentations are not critical and any number of ball mounts greater than two may be used.

I claim:

1. Mounting means for rotor balancing machines comprising a lower mounting means having three curved indentations on its top surface, at least one in a different vertical plane than said other two indentations, a ball in each of said indentations, an upper mounting means having three curved indentations on its bottom surface corresponding to each of said indentations in said lower mounting means, said upper mounting means resting on said balls, a slot in said upper mounting means, a post mounted in said lower mounting means and extending through said slot, and a ball bearing on said post contacting the inner surface of said slot, whereby the motion of said upper mounting means is constrained to the plane of said slot.

2. Mounting means for vibration comprising a lower mounting means having a plurality of curved indentations on its top surface, at least one in a different vertical plane than other of said indentations, a ball in each of said indentations in said lower mounting means, said upper mounting means resting on said balls, a slot in said upper mounting means, a post mounted in said lower mounting means and extending through said slot, and a ball bearing on said post contacting the inner surface of said slot, whereby the motion of said upper mounting means is constrained to the plane of said slot.

3. Mounting means for vibration comprising a lower mounting means having three curved indentations on its top surface, at least one in a different vertical plane than said other two indentations, a ball in each of said indentations, an upper mounting means having three curved indentations on its bottom surface corresponding to each of said indentations in said lower mounting means, said upper mounting means resting on said balls, and centrally located means connected to said upper and lower mounting means to substantially restrain said vibration to one transverse plane but permitting some rotation of said upper mounting means.

References Cited in the file of this patent

UNITED STATES PATENTS

| | | |
|---|---|---|
| 1,600,569 | Sperry | Sept. 21, 1926 |
| 2,534,918 | Kroft | Dec. 19, 1950 |
| 2,594,581 | Phelps | Apr. 29, 1952 |
| 2,724,971 | Kroft | Nov. 29, 1955 |